United States Patent [19]

Prince et al.

[11] 4,001,915

[45] Jan. 11, 1977

[54] ELECTRIC EXTENSION OF HIND LEG

[75] Inventors: Ralph P. Prince, Storrs, Conn.; Rudy G. Westervelt, Newfield, N.Y.

[73] Assignee: Council of Livestock Protection, Inc., New York, N.Y.

[22] Filed: Oct. 1, 1975

[21] Appl. No.: 618,462

[52] U.S. Cl. .................................................. 17/45
[51] Int. Cl.² ......................................... A22B 3/06
[58] Field of Search ............... 17/45, 1 E, 1 R, 50, 17/11, 44; 43/98; 128/406

[56] References Cited

UNITED STATES PATENTS

| | | | |
|---|---|---|---|
| 1,949,985 | 3/1934 | Weber | 17/1 E |
| 3,012,271 | 12/1961 | Morse | 17/45 |
| 3,537,130 | 11/1970 | McDonnell | 17/50 |

*Primary Examiner*—Russell R. Kinsey
*Assistant Examiner*—James D. Hamilton
*Attorney, Agent, or Firm*—Moonray Kojima

[57] ABSTRACT

A method of extending the hind legs of a slain animal for the purpose of mechanical shackling comprising the steps of applying an electric voltage to the bare skin near the anus of the animal and using the bare skin between the hind legs as ground. Involuntary motion is also suppressed thereby.

2 Claims, No Drawings

ELECTRIC EXTENSION OF HIND LEG

This invention relates to a method of extending the hind legs of a slain animal and comprises applying an electric voltage to the bare skin near the anus of the animal and using the bare skin between the hind legs as ground.

In copending application Giger, Westervelt Ser. No. 618,463, filed Oct. 1, 1975 now U.S. Pat. No. 3,967,343 there is disclosed a double rail conveyor system for slaughtering animals. In copending application Giger Ser. No. 618,467, filed Oct. 1, 1975 now U.S. Pat. No. 3,991,441, there is disclosed apparatus for mechanically shackling a slaughtered animal such as slaughtered using the double rail system. Both applications were filed concurrently herewith and assigned to the assignee hereof.

To mechanically shackle the hind legs of a slain animal, such as that done by the use of the above mentioned double rail system, it is desirable that involuntary motion of the animal be suppressed and that the hind legs of the animal be extended.

The inventors have discovered that the hind legs of the slain animal can be extended by the application of an electric voltage. An appropriate voltage may, for example, be applied to the bare skin near the anus of the slain animal with the bare skin between the hind legs used as ground. It was discovered that the voltage also suppressed involuntary motion of the slain animal.

In one actual example, a lamb was placed upright with its legs straddling the double rails such as disclosed in the above Giger, Westervelt application, and slaughtered. The animal was restrained on the double rails by restraining means. After death, the slain lamb still had involuntary motion and the legs tended to contract. With the slain animal positioned on the double rails with its legs straddling the rails, the hind legs were held slightly extended outwardly at an angle to expose the bare skin in the neighborhood of the anus and a bare skin between the hind legs. An electrode was applied to the bare skin near the anus and the other electrode was applied to the bare skin between the hind legs. Suitable voltage was applied. This caused the hind legs to extend and the involuntary motion to be suppressed.

The bare spot between the legs being close to the double rail, in another embodiment, a ground lead was placed on the rails so that such bare skin was in contact therewith and only one movable electrode was needed for placement on the bare skin near the anus. In such an embodiment, it was found that the electrode held by a pole or rod could be placed on that bare skin near the anus without manually extending the legs for access to the bare skin. In this latter manner, the hind legs can be readily and automatically extended and involuntary motion suppressed as the slain animal is moved down the conveyor and the hind legs upon extension by such electrical treatment can be readily shackled mechanically.

The amount of voltage used can be suitably selected and the current can also be suitably selected. The amount of time required to effect the operation was short and did not interfere with the slaughtering or shackling operation.

The foregoing description is illustrative of the principles of the invention. Numerous variations and modifications thereof would be apparent to the worker skilled in the art. All such variations and modifications are to be construed to be within the spirit and scope of the invention.

What is claimed is:

1. In a double rail conveyor system for slaughtering animals positioned in an upright position and employing apparatus for mechanical shackling of a slain animal, the method of extending the hind legs of said slain animal so as to enable said shackling apparatus to grab one of the hind legs of said slain animal and convey said slain animal in a position with the head directed downward, said method comprising
    positioning said slain animal already in an upright position on said double rail conveyor to expose a bare skin spot near the anus;
    placing an electrode on said bare skin spot near said anus;
    placing a ground electrode on a bare skin spot between said hind legs; and
    applying a voltage to said electrodes whereby said hind legs become extended and involuntary motion is suppressed thereby enabling said mechanical shackling means to grab one of said hind legs and convey said slain animal.

2. The method of claim 1, wherein said electrodes are placed on said animal automatically.

* * * * *